US008326060B2

(12) United States Patent
Ahn et al.

(10) Patent No.: US 8,326,060 B2
(45) Date of Patent: Dec. 4, 2012

(54) VIDEO DECODING METHOD AND VIDEO DECODER BASED ON MOTION-VECTOR DATA AND TRANSFORM COEFFICIENTS DATA

(75) Inventors: Jong-hak Ahn, Suwon-si (KR); Sang-chang Cha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1134 days.

(21) Appl. No.: 12/198,961

(22) Filed: Aug. 27, 2008

(65) Prior Publication Data

US 2008/0317133 A1 Dec. 25, 2008

Related U.S. Application Data

(62) Division of application No. 10/647,254, filed on Aug. 26, 2003, now Pat. No. 7,813,569.

(30) Foreign Application Priority Data

Nov. 29, 2002 (KR) .................. 10-2002-0075398

(51) Int. Cl.
*G06K 9/36* (2006.01)
*G06K 9/46* (2006.01)
(52) U.S. Cl. ..................................... 382/233
(58) Field of Classification Search .......... 382/232, 382/233, 236, 238, 248, 250, 251, 253; 375/240.03, 375/240.08, 240.12, 240.26, 240.2, 240.22, 375/240.24, 240.25, 240.27, E07.026, E7.124, 375/E7.253, E7.256; 348/403.1, 441
See application file for complete search history.

(56) References Cited

U.S. PATENT DOCUMENTS

| 5,212,549 | A | * | 5/1993 | Ng et al. ............... 375/240.15 |
| 5,260,782 | A | | 11/1993 | Hui |
| 5,563,649 | A | | 10/1996 | Gould et al. |
| 5,701,164 | A | * | 12/1997 | Kato .......................... 348/699 |
| 6,272,179 | B1 | | 8/2001 | Kadono |
| 6,442,201 | B2 | | 8/2002 | Choi |
| 6,525,783 | B1 | | 2/2003 | Kim et al. |
| 6,584,154 | B1 | | 6/2003 | Wu |
| 6,625,214 | B1 | | 9/2003 | Umehara et al. |
| 6,628,839 | B1 | * | 9/2003 | Komiya et al. ............ 382/248 |
| 6,704,361 | B2 | | 3/2004 | Bublil et al. |
| 6,819,715 | B2 | * | 11/2004 | Nishi et al. ............... 375/240.25 |
| 6,862,320 | B1 | * | 3/2005 | Isu et al. ................... 375/240.27 |
| 6,931,062 | B2 | * | 8/2005 | Zhong ...................... 375/240.12 |
| 7,181,070 | B2 | | 2/2007 | Petrescu et al. |
| 7,813,429 | B2 | * | 10/2010 | Winger .................... 375/240.16 |
| 7,813,569 | B2 | * | 10/2010 | Ahn et al. ................... 382/233 |
| 2001/0048719 | A1 | | 12/2001 | Takeuchi et al. |
| 2002/0181790 | A1 | | 12/2002 | Nakata |
| 2004/0101056 | A1 | | 5/2004 | Wong et al. |

(Continued)

FOREIGN PATENT DOCUMENTS

| JP | 4-70060 A | 3/1992 |
| JP | 4-220081 A | 8/1992 |
| JP | 2002-94997 A | 3/2002 |

*Primary Examiner* — Amir Alavi
(74) *Attorney, Agent, or Firm* — Sughrue Mion, PLLC

(57) ABSTRACT

An MPEG video decoding method and an MPEG video decoder are provided. The method includes determining whether to perform motion compensation on motion-vector-decoded data or not depending on a value of a decoded motion vector, determining whether to perform inverse discrete cosine transformation (IDCT) on motion-compensated data or not depending on values of decoded DCT coefficients, and generating a decoded image based on the results of the two determinations.

11 Claims, 8 Drawing Sheets

U.S. PATENT DOCUMENTS

| | | |
|---|---|---|
| 2004/0105498 A1 | 6/2004 | Ahn et al. |
| 2005/0063466 A1 | 3/2005 | Etoh et al. |
| 2005/0100099 A1* | 5/2005 | Nishi et al. ............... 375/240.25 |
| 2008/0317133 A1* | 12/2008 | Ahn et al. ............... 375/240.24 |

* cited by examiner

FIG. 10A

| QP | AKIYO 118800blk | FOREMAN 475200blk | MOBILE 475200blk |
|---|---|---|---|
| 5 | 90% | 62% | 22% |
| 12 | 97% | 89% | 48% |
| 20 | 99% | 95% | 69% |

FIG. 10B

| QP | AKIYO 118800blk | FOREMAN 475200blk | MOBILE 475200blk |
|---|---|---|---|
| 5 | 95% | 29% | 9% |
| 12 | 96% | 47% | 10% |
| 20 | 97% | 36% | 13% |

FIG. 10C

| SEQUENCE | QP | SPEED (fps) | | RATE |
| | | MS REFERENCE | OPTIMIZED | |
|---|---|---|---|---|
| AKIYO (qcif) | 5 | 46 | 111 | 2.4 |
| | 12 | 52 | 133 | 2.56 |
| | 20 | 55 | 142 | 2.58 |
| FOREMAN (cif) | 5 | 8 | 16 | 2.0 |
| | 12 | 12 | 29 | 2.41 |
| | 20 | 13 | 30 | 2.30 |
| MOBILE (cif) | 5 | 3 | 5 | 1.67 |
| | 12 | 6 | 11 | 1.83 |
| | 20 | 8 | 15 | 1.89 |

VIDEO DECODING METHOD AND VIDEO DECODER BASED ON MOTION-VECTOR DATA AND TRANSFORM COEFFICIENTS DATA

CROSS REFERENCE TO RELATED APPLICATION

This application is a divisional of U.S. patent application Ser. No. 10/647,254 filed Aug. 26, 2003, now U.S. Pat. No. 7,813,569 the disclosure of which is incorporated herein by reference in its entirety.

Further, this application claims priority from Korean Patent Application No. 10-2002-0075398, filed on Nov. 29, 2002, in the Korean Intellectual Property Office, the disclosure of which is incorporated herein in its entirety by reference.

BACKGROUND OF THE INVENTION

1. Field of the Invention

The present invention relates to an MPEG video decoding method and an MPEG video decoder.

2. Description of the Related Art

In recent years, strenuous effort has been made to provide methods for reproducing moving pictures in a mobile device, such as a mobile phone or a personal digital assistant (PDA). Since mobile devices are required to have low power consumption, they inevitably have limitations in terms of bandwidth and storage capacity, developing the need for a moving picture decoder that can operate at higher speeds and utilize memory more efficiently.

Even though various moving picture compression standards have already been suggested, H.263 and MPEG-4 simple profiles are considered the best choices for mobile wireless communications. MPEG-4 provides tolerance to channel errors, includes various functionality applicable to limited bandwidth and defines a streaming video profile. MPEG-4 has a high data compression rate. In order to support a high data compression rate, a considerable amount of encoder and decoder calculations are required. In short, the complicated structure of MPEG-4 makes it difficult to realize software that can perform real-time operations appropriate for MPEG-4.

FIG. 1 is a diagram illustrating the data hierarchy of MPEG video. The hierarchy is comprised of six levels: a sequence layer, a group of pictures (GOP) layer, a picture layer 110, a slice layer 120, a macroblock layer 130, and a block layer 140. In FIG. 1, the picture layer 110 and the underlying layers 120, 130, and 140 are shown.

Referring to FIG. 1, the picture layer 110 is a picture image comprised of slices 111 having a predetermined length, and the slice layer 120 is a band of an arbitrary number of macroblocks. The macroblock layer 130 is comprised of macroblocks, each containing six 8×8 pixel blocks, i.e., four blocks of a brightness signal Y and two blocks of color difference signal (Cb and Cr). The block layer 140 is comprised of 8×8 pixel blocks and includes discrete cosine transform (DCT) coefficient information.

The macroblock layer 130 includes motion vector information. The motion vector information is a value obtained by encoding the difference between motion vectors of a current macroblock and a previous macroblock.

Hereinafter, an MPEG-4 encoding method will be briefly described before explanation of the structure and operation of an MPEG-4 video decoder.

An input video object plane (VOP) is divided into macroblocks. The VOP is the basic unit of data in an MPEG-4 encoding process. During this process, each 8×8 block of a macroblock is DCTed and quantized. Thereafter, quantized DCT coefficients and a quantization width are encoded by using a variable length encoding method. This entire process is called intra-frame encoding.

A separate encoding process begins by using a motion detection method, such as block-matching. This technique consists of comparing macroblocks in temporally adjacent VOPs. After identifying the predicted macroblock having the least difference with a target macroblock, the motion variation signal, or motion vector, is obtained. The VOP of the predicted macroblock is called the reference VOP. By performing motion compensation on the reference VOP, based on the motion vector, the predicted macroblock can be obtained. Thereafter, the motion variation is DCTed and the DCT coefficients are quantized. The quantized DCT coefficients, the motion vector, and a quantization width are encoded by using a variable length encoding method. This entire process is called inter-frame encoding.

A receiving party decodes compressed and encoded VOP data by using a variable length decoding method. The difference signal is restored by performing inverse quantization and inverse DCT on quantized DCT coefficients. Thereafter, a predicted macroblock is obtained based on a motion vector and is added to the differential signal, thus reproducing image data.

FIG. 2 is a block diagram of a conventional MPEG-4 video decoder. Referring to FIG. 2, a conventional MPEG-4 video decoder 200 includes a demultiplexer 210 for an MPEG-4 video bitstream input thereinto, a texture decoding unit 220 for performing texture decoding, a restructured VOP storing unit 230, and a motion compensation unit 240.

The texture decoding unit 220 includes a variable length decoder (VLD) 221, an inverse scanner 222, an inverse quantizer 223, and an inverse discrete cosine transformer 224. The motion compensation unit 240 includes a motion decoder 241, a VOP memory 242, and a motion compensator 243.

Hereinafter, a general inter-frame reproducing method will be described. Intra-frame reproduction is the same as the inter-frame reproduction except for the process of motion compensation.

Through syntax-parsing of the bitstream, the header is separated and image data is extracted. Then, the variable length decoder 221 creates DCT coefficients through Huffman decoding of the image data, and the inverse scanner 222 creates data having the same order as the image data through inverse scanning.

The inverse quantizer 223 inversely quantizes the inversely-scanned data, and the inverse discrete cosine transformer 224 creates a differential image by performing DCT. When creating the differential image, a VOP for the differential image is generated by repeatedly performing macroblock-wise decoding. Then the restructured differential image VOP is stored in the VOP memory 242. When the differential image VOP is completed through texture decoding, motion decoding is performed utilizing a motion vector.

The motion decoder 241 creates a predicted image by decoding a motion vector. The motion compensator 243 adds this predicted image to the differential image stored in the VOP memory 242 and creates a decoded image.

FIG. 3 is a flowchart of a decoding method 300 performed in the conventional MPEG-4 video decoder 200 shown in FIG. 2. Referring to FIG. 3, information on the current macroblock is obtained in step S301 by decoding the header of the current macroblock. A motion vector is obtained in step S302, and the decoded motion vector is stored in motion vector memory in step S303. Thereafter, DCT coefficients are decoded in step S304.

A differential image macroblock is created by inversely scanning the decoded DCT coefficients in step S305, inversely quantizing the inversely-scanned DCT coefficients in step S306, and inversely discrete-cosine-transforming the inversely quantized DCT coefficients in step S307. The differential image macroblock is recorded in a frame buffer in step S308.

Thereafter, in step S309, it is determined whether or not all macroblocks belonging to one frame have been decoded.

If it is determined that all the macroblocks belonging to one frame have not yet been decoded, then steps S301 through S308 are repeated until one frame is generated.

If it is determined that all the macroblocks belonging to one frame have been decoded, i.e., if one frame is completed, then motion compensation is performed in step S310. Motion compensation represents a process of creating a predicted image macroblock. Through reference to motion vector memory, the motion vector is obtained and applied to previous image data to produce the predicted image macroblock.

Thereafter, in step S311, the motion-compensated predicted image frame is added to a differential image stored in a frame buffer. When the frame of the motion-compensated predicted image is added to the frame of the differential image recorded in the frame buffer, a decoded image frame is created.

FIG. 4 is a diagram illustrating unit frames used to generate a decoded image, according to a conventional MPEG-4 video decoding method. Referring to FIG. 4, in the prior art, a decoded image VOP 430 is generated by adding a predicted image VOP 410 and a differential image VOP 420.

Specifically, macroblocks 1 through 16 of the predicted image constitute the predicted image VOP 410, and macroblocks 1' through 16' of the differential image constitute the differential image VOP 420. Thereafter, macroblocks 1" through 16" of the decoded image VOP 430 are generated by adding the macroblocks 1 through 16 of the predicted image VOP 410 to the macroblocks 1' through 16' of the differential image VOP 420. In other words, the macroblock 1" of the decoded image VOP 430 is generated by adding the macroblock 1 of the predicted image VOP 410 and the macroblock 1' of the differential image VOP 420. The macroblock 2" of the decoded image VOP 430 is generated by adding the macroblock 2 of the predicted image VOP 410 and the macroblock 2' of the differential image VOP 420. In the same manner, the rest of the macroblocks 3" through 16" of the decoded image VOP 430 are generated by adding the macroblocks 3 through 16 of the predicted image VOP 410 and their corresponding macroblocks 3' through 16' of the differential image VOP 420.

According to the preceding conventional decoding method, a decoded image is stored in the current frame memory and preserved until a next frame is decoded. The current frame memory is always filled with the most recent decoded images. Accordingly, even when an image currently being decoded is the same as the previous image, the current image unnecessarily undergoes the same procedures used to generate the previous image. This aspect of the conventional method crates inefficiency in the decoding process.

Furthermore, according to the conventional decoding method, inverse DCT is performed first, a complete differential image frame is stored in a frame buffer, and then motion compensation is performed. Therefore, even in a block with a motion vector of 0, it is necessary to create a predicted image based on a previous image and store macroblocks of the predicted image. Since having a motion vector of 0 indicates portions of the previous image and the predicted image are the same, it is a waste of memory space to store the predicted image separately from the previous image.

Moreover, according to the present invention, texture decoding and motion compensation are sequentially performed. Thus, a motion vector generated during a variable length decoding process is stored in memory until referenced for motion compensation. In which case motion vector memory must be sufficient to support the number of macroblocks in a VOP.

In the case of decoding high compression rate data, inverse DCT and motion compensation may not always be necessary. However, the performance advantages gained by omitting these routines are not applicable to the conventional MPEG-4 video decoder. In creating a decoded image, by adding a differential image and a predicted image, the conventional MPEG-4 video decoder is further constrained by memory demands.

SUMMARY OF THE INVENTION

The present invention provides an MPEG video decoding method and an MPEG video decoder, which are capable of conserving memory capacity and increasing the speed of decoding.

According to an illustrative aspect of the present invention, there is provided an exemplary MPEG video decoding method. The method includes determining whether to perform motion compensation on motion-vector-decoded data or not depending on a value of a decoded motion vector, determining whether to perform inverse discrete cosine transformation (IDCT) on motion-compensated data or not depending on values of decoded DCT coefficients, and generating a decoded image based on the results of the two determination steps.

Preferably, but not necessarily, determining whether to perform motion compensation or not includes determining whether or not the decoded motion vector is 0, and determining not to perform motion compensation if the decoded motion vector is 0 and determining to perform motion compensation if the decoded motion vector is not 0.

Preferably, but not necessarily, determining whether to perform inverse DCT or not includes determining whether or not the value of each decoded DCT coefficient is 0, and determining not to perform inverse DCT if the value of each decoded DCT coefficient is 0 and determining to perform inverse DCT if the value of any decoded DCT coefficient is not 0.

According to another illustrative aspect of the present invention, there is provided an exemplary MPEG video decoding method. The method includes generating a predicted image macroblock, generating a differential image macroblock, generating a decoded image macroblock by adding the predicted image macroblock and the differential image macroblock, writing the decoded image macroblock in a frame buffer, and filling the frame buffer with decoded image macroblocks by circularly performing the previous steps.

According to another illustrative aspect of the present invention, there is provided an exemplary MPEG video decoding method. The method includes generating a predicted image macroblock depending on a value of a decoded motion vector, writing the predicted image macroblock in a macroblock buffer, generating a differential image macroblock depending on values of decoded DCT coefficients, generating a decoded image macroblock by adding the differential image macroblock to the predicted image macroblock written in the macroblock buffer, and writing the decoded image macroblock in a frame buffer.

Preferably, but not necessarily, generating the predicted image macroblock includes determining whether or not the decoded motion vector is 0, determining a previous image macroblock as the predicted image macroblock if the decoded motion vector is 0, and generating the predicted image macroblock by performing motion compensation on the previous image macroblock if the decoded motion vector is not 0.

Preferably, but not necessarily, generating the differential image macroblock includes determining whether or not the value of each decoded DCT coefficient is 0, determining not to generate the differential image macroblock if the value of each decoded DCT coefficient is 0, and generating the differential image macroblock by performing inverse DCT if the value of any decoded DCT coefficient is not 0. Here, if the differential image macroblock is not generated, adding the differential image to the predicted image is skipped.

According to another illustrative aspect of the present invention, there is provided an exemplary MPEG video decoder. The MPEG video decoder includes a motion vector determiner determining whether to perform motion compensation or not depending on a value of a decoded motion vector, and a DCT coefficient determiner determining whether to perform inverse discrete cosine transform (IDCT) or not depending on values of decoded DCT coefficients. Here, an MPEG video stream is decoded based on determinations of the motion vector determiner and the DCT coefficient determiner.

Preferably, but not necessarily, the motion vector determiner determines not to perform motion compensation if the decoded motion vector is 0, and determines to perform motion compensation if the decoded motion vector is not 0.

Preferably, but not necessarily, the DCT coefficient determiner determines not to perform inverse DCT if the value of each decoded DCT coefficient is 0, and determines to perform inverse DCT if the value of any decoded DCT coefficient is not 0.

According to another illustrative aspect of the present invention, there is provided an exemplary MPEG video decoder. The MPEG video decoder includes a predicted image calculation unit generating a predicted image macroblock, a differential image calculation unit generating a differential image macroblock, a macroblock buffer where the predicted image macroblock and the differential image macroblock are added, and a frame buffer where a decoded image macroblock is written, after the decoded image macroblock is generated by adding the predicted image macroblock and the differential image macroblock in the macroblock buffer.

According to another illustrative aspect of the present invention, there is provided an exemplary MPEG video decoder. The MPEG video decoder includes a predicted image calculation unit generating a predicted image macroblock depending on a value of a decoded motion vector, a differential image calculation unit generating a differential image macroblock depending on values of decoded DCT coefficients, a macroblock buffer where the predicted image macroblock and the differential image macroblock are added, and a frame buffer where a decoded image macroblock is written, after the decoded image macroblock is generated by adding the predicted image macroblock and the differential image macroblock in the macroblock buffer.

Preferably, but not necessarily, the predicted image calculation unit includes a motion vector determiner determining whether or not the decoded motion vector is 0, and a motion compensator performing motion compensation depending on a result of the determination.

Preferably, but not necessarily, the differential image calculation unit includes a DCT coefficient determiner determining whether or not the value of each decoded DCT coefficient is 0, and an inverse discrete cosine transformer performing inverse DCT depending on a the result of the determination.

BRIEF DESCRIPTION OF THE DRAWINGS

The above and other features and advantages of the present invention will become more apparent by describing in detail exemplary embodiments thereof with reference to the attached drawings in which:

FIG. 10A is a table showing the rates of blocks with DCT coefficients of 0;

FIG. 10B is a table showing the rates of blocks with a motion vector of 0; and

FIG. 10C is a table comparing the performance of an algorithm according to an exemplary embodiment of the present invention to that of a conventional algorithm.

DETAILED DESCRIPTION OF THE INVENTION

Hereinafter, the present invention will be described in greater detail with reference to the accompanying drawings.

First of all, an MPEG-4 video decoding method, according to an exemplary embodiment of the present invention, will be described in the following paragraphs. More specifically, the description will detail how unit data is processed to generate a decoded image.

Figure 1:
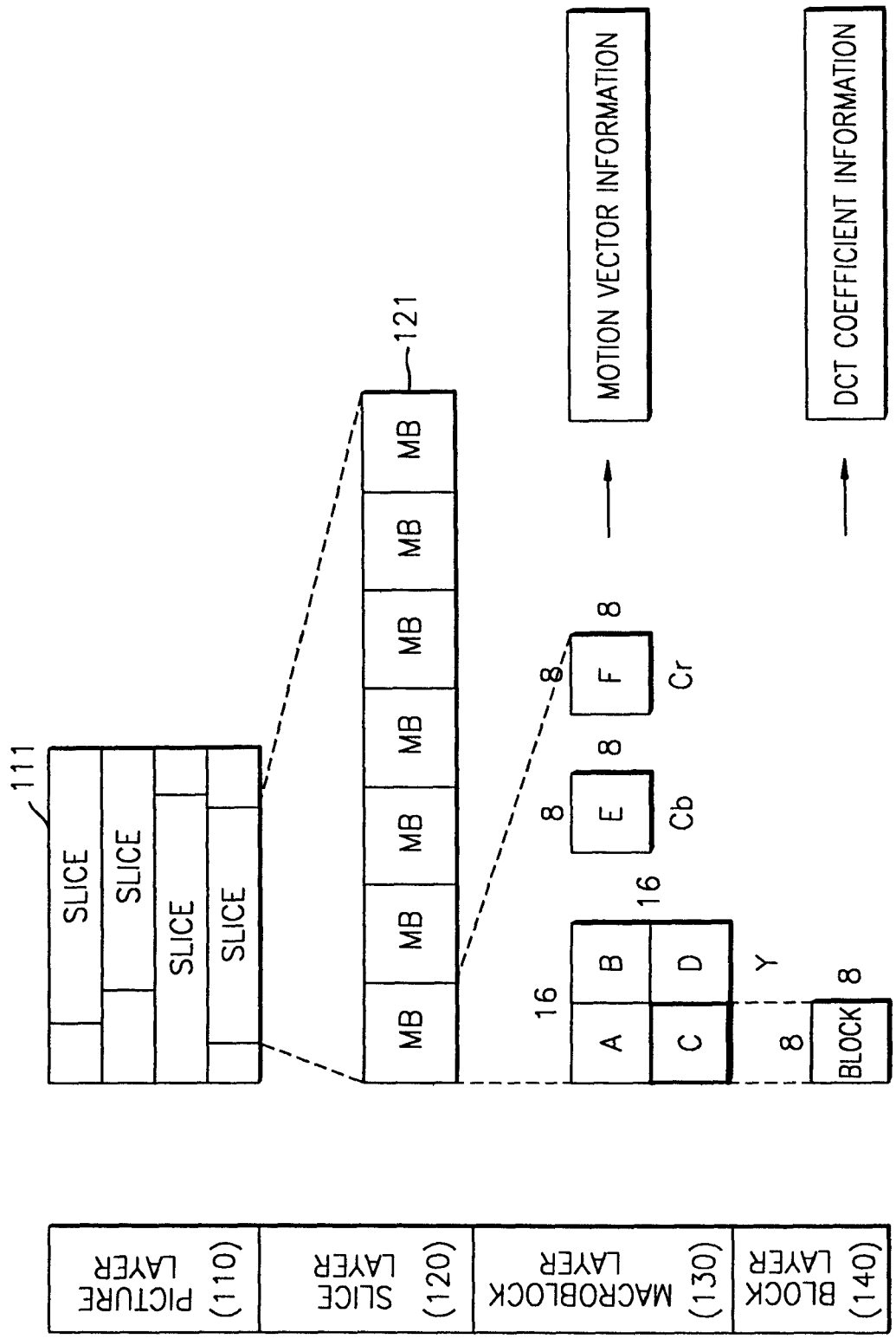
FIG. 1 is a diagram illustrating the data hierarchy of MPEG video.
Figure 2:
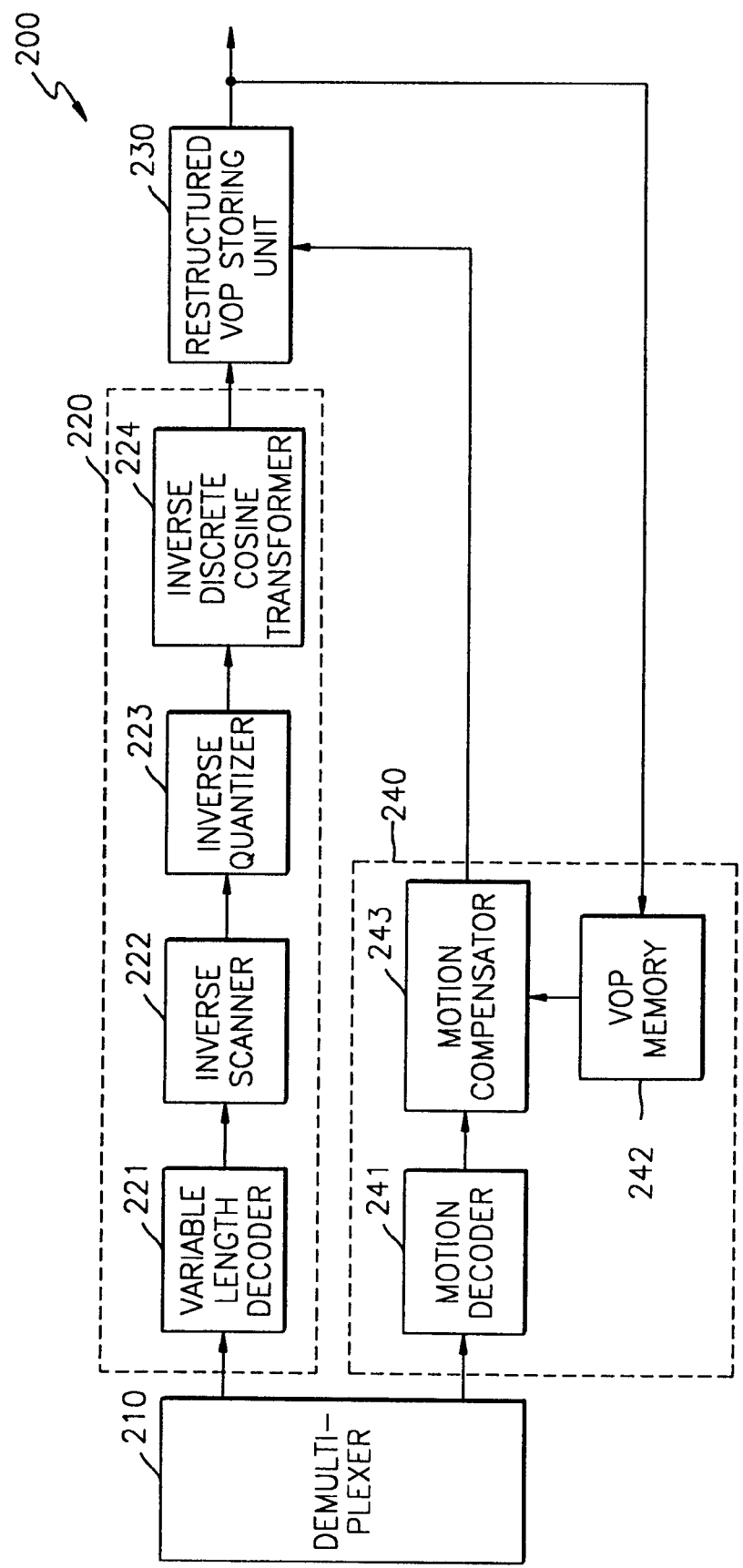
FIG. 2 is a block diagram of a conventional MPEG-4 video decoder.
Figure 3:
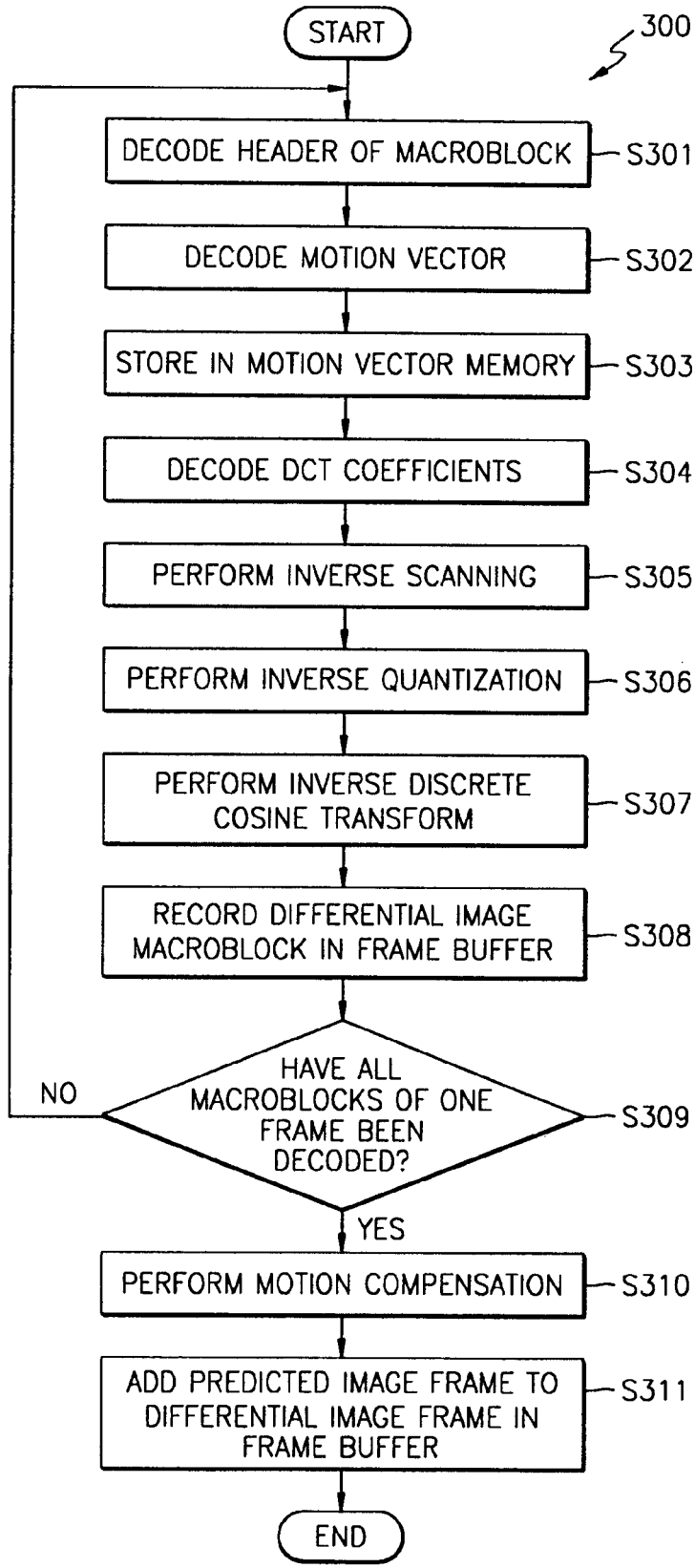
FIG. 3 is a flowchart of a conventional MPEG-4 video decoding method performed in the MPEG-4 video decoder shown in FIG. 2.
Figure 4:
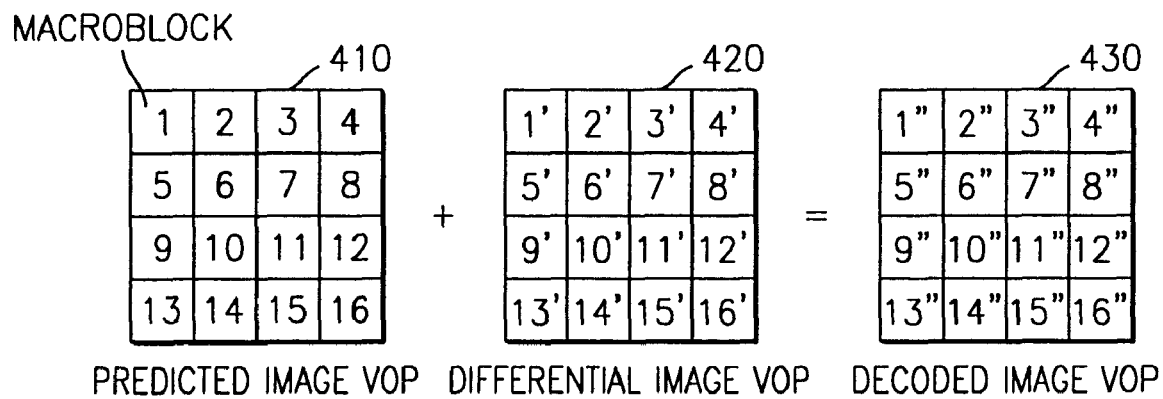
FIG. 4 is a diagram illustrating unit frames used to generate a decoded image according to a conventional MPEG-4 video decoding method.
Figure 5:
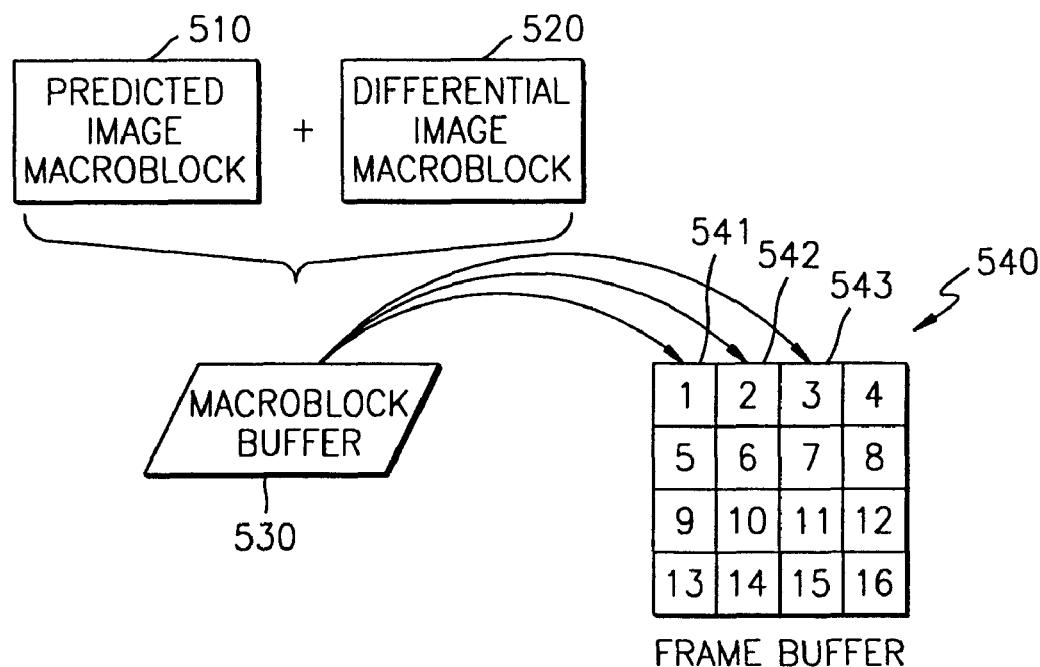
FIG. 5 is a diagram illustrating unit data processed and then used to generate a decoded image according to an MPEG-4 video decoding method of an exemplary embodiment of the present invention.

By processing data at the macroblock level, rather than the VOP level, the present invention conserves memory capacity necessary for MPEG-4 decoding. In the present invention, a predicted image macroblock is generated and then recorded in a macroblock buffer. Thereafter, a differential image macroblock is generated and added to the predicted image macroblock in the macroblock buffer. Thereafter, the result of the adding is written in a frame buffer. For example, as shown in FIG. 5, a macroblock 510 of a predicted image is written in a macroblock buffer 530, and then a macroblock 520 of a differential image is added to the macroblock 510 written in the macroblock buffer 530, thus generating a macroblock of a decoded image. Thereafter, the decoded image macroblock is written in a predetermined part, e.g., 541, 542 or 543, of a frame buffer 540.

In the present invention, when generating a predicted image macroblock and a differential image macroblock, it is determined first whether or not a motion vector is 0 and whether or not the number of DCT coefficients is 0. Specifically, motion compensation is performed only if a motion vector is not 0. When the motion vector is 0, motion compensation is not performed. A differential image is generated only when a value of a DCT coefficient is not 0. When the value of each DCT coefficient is 0, a previous differential image is directly used rather than generating a new differential image.

Figure 6:
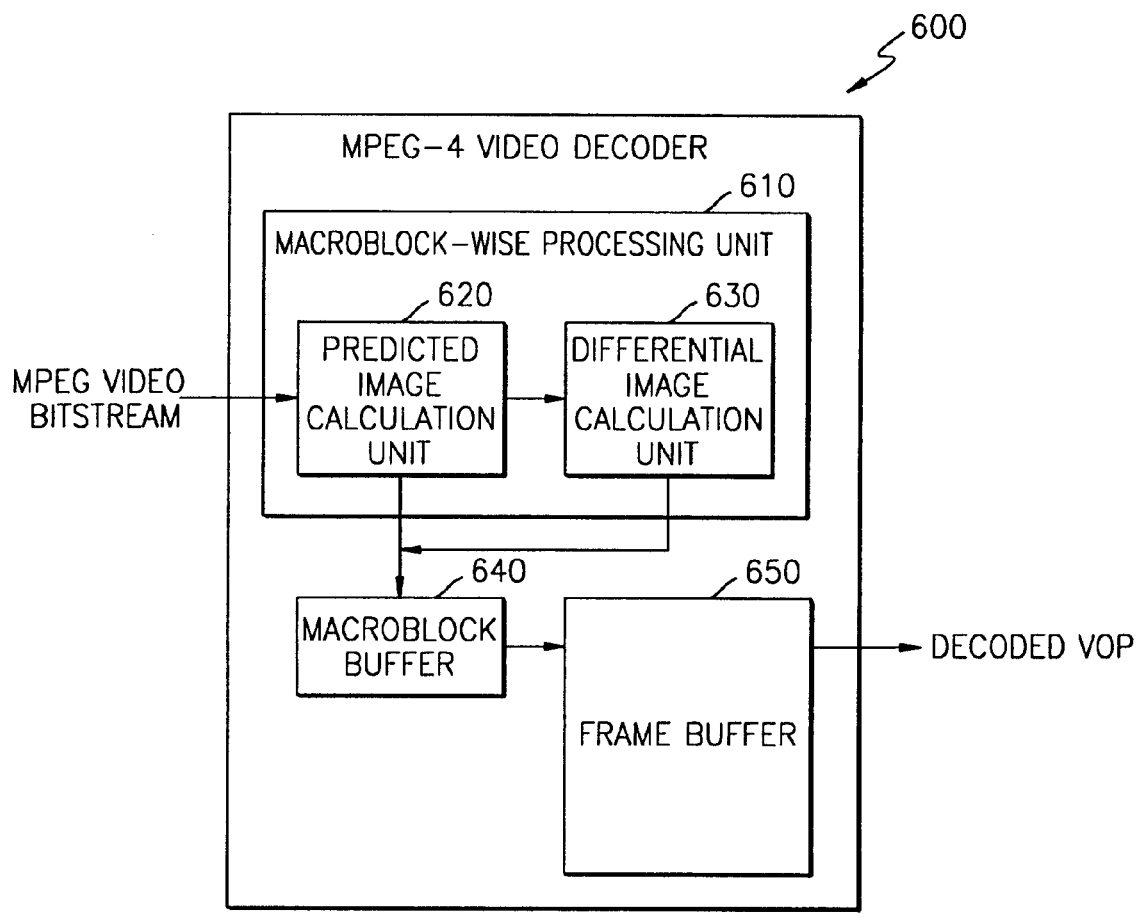
FIG. 6 is a block diagram of an MPEG-4 video decoder according to an exemplary embodiment of the present invention.

FIG. 6 is a block diagram of an MPEG-4 video decoder 600 according to an exemplary embodiment of the present invention. Referring to FIG. 6, the MPEG-4 video decoder 600 includes a macroblock-wise processing unit 610 comprised of a predicted image calculation unit 620 and a differential image calculation unit 630, a macroblock buffer 640, and a frame buffer 650.

The predicted image calculation unit 620 decodes a motion vector, determines whether or not the decoded motion vector satisfies a predetermined condition, and then performs motion compensation depending on the result of that determination. The differential image calculation unit 630 decodes DCT coefficients, determines whether or not the decoded DCT coefficients satisfy a predetermined condition, and then generates a differential image based on the result of this determination.

The macroblock buffer 640 generates decoded image macroblocks by adding the predicted image macroblocks created by the predicted image calculation unit 620 and the differential image macroblocks created by the differential image calculation unit 630.

The frame buffer 650 receives decoded image macroblocks from the macroblock buffer 640 individually, and then stores them in a single frame.

Figure 7:
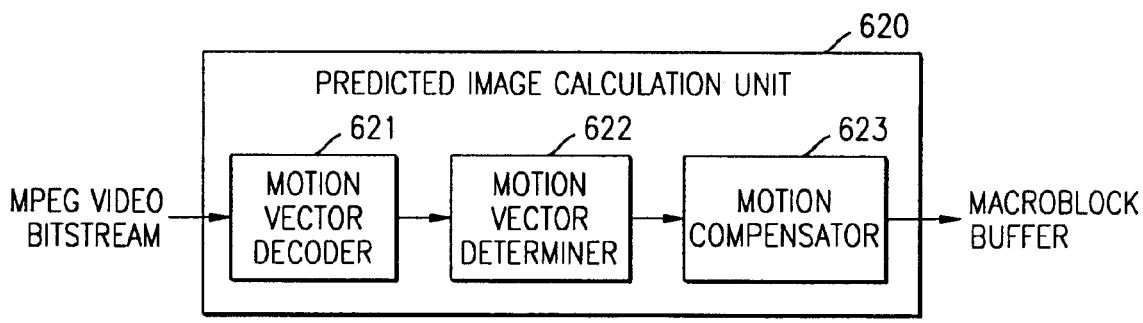
FIG. 7 is a block diagram of the predicted image calculation unit shown in FIG. 6.

FIG. 7 is a block diagram of the predicted image calculation unit 620 shown in FIG. 6. Referring to FIG. 7, the predicted image calculation unit 620 includes a motion vector decoder 621, a motion vector determiner 622, and a motion compensator 623.

The motion vector decoder 621 decodes a motion vector by using a variable length decoding method. The motion vector determiner 622 determines whether or not the motion vector, decoded by the motion vector decoder 621, is 0. Whether to perform motion compensation or not depends on the result of this determination. If the decoded motion vector is 0, motion compensation is not performed, and macroblocks of a previous frame are used in subsequent decoding processes. If the decoded motion vector is not 0, motion compensation is performed.

The motion compensator 623 performs motion compensation on the macroblocks of the previous frame referring to the decoded motion vector. When the decoded motion vector is 0, the macroblocks of the previous frame are written directly in the macroblock buffer 640. Otherwise, macroblocks obtained by performing motion compensation on the macroblocks of the previous frame are written in the macroblock buffer 640.

Therefore, the predicted image macroblocks are written in the macroblock buffer 640 by the predicted image calculation unit 620.

Figure 8:
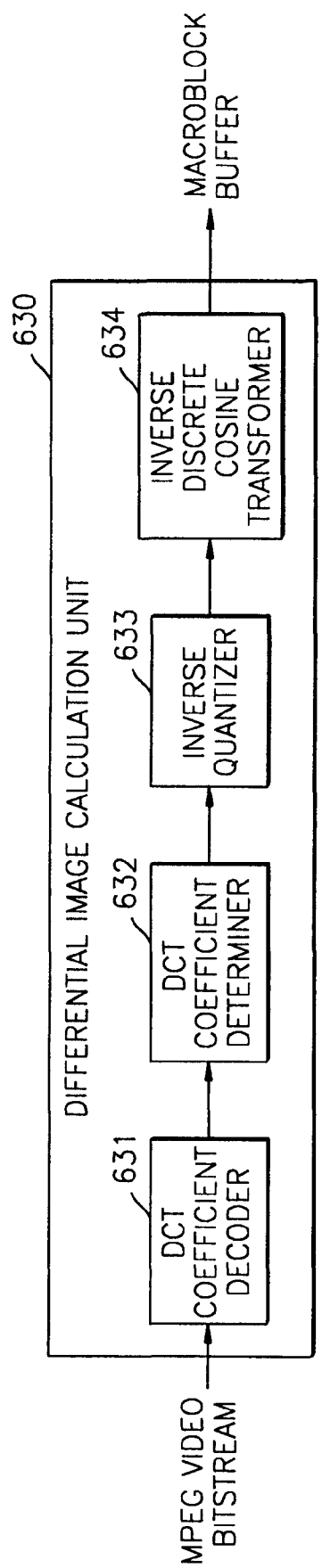
FIG. 8 is a block diagram of the differential image calculation unit shown in FIG. 6.

FIG. 8 is a block diagram of the differential image calculation unit 630 shown in FIG. 6. Referring to FIG. 8, the differential image calculation unit 630 includes a DCT coefficient decoder 631, a DCT coefficient determiner 632, an inverse quantizer 633, and an inverse discrete cosine transformer 634.

The DCT coefficient decoder 631 decodes DCT coefficients by using a variable length decoding method. The DCT coefficient determiner 632 determines whether or not a value of each DCT coefficient, decoded by the DCT coefficient decoder 631, is 0. Whether to perform inverse quantization and inverse DCT or not depends on the result of this determination. If the value of each decoded DCT coefficient is 0, inverse DCT is not performed, and accordingly, a differential image is not generated. If the value of any decoded DCT coefficient is not 0, inverse DCT is performed.

The inverse quantizer 633 inversely quantizes a quantized DCT coefficient, and the inverse discrete cosine transformer 634 performs IDCT on the inversely-quantized DCT coefficient.

Accordingly, macroblocks of a differential image are generated by the differential image calculation unit 630. In a case where the differential image is not generated because the value of each DCT coefficient is 0, a process of adding the macroblocks of the differential image and the macroblocks of the predicted image is omitted. Only when the differential image is generated, is the adding process performed and the results of the adding process are written in the macroblock buffer 640.

The macroblock buffer 640 is filled with decoded image macroblocks, which are sent individually to the frame buffer 650.

Figure 9:
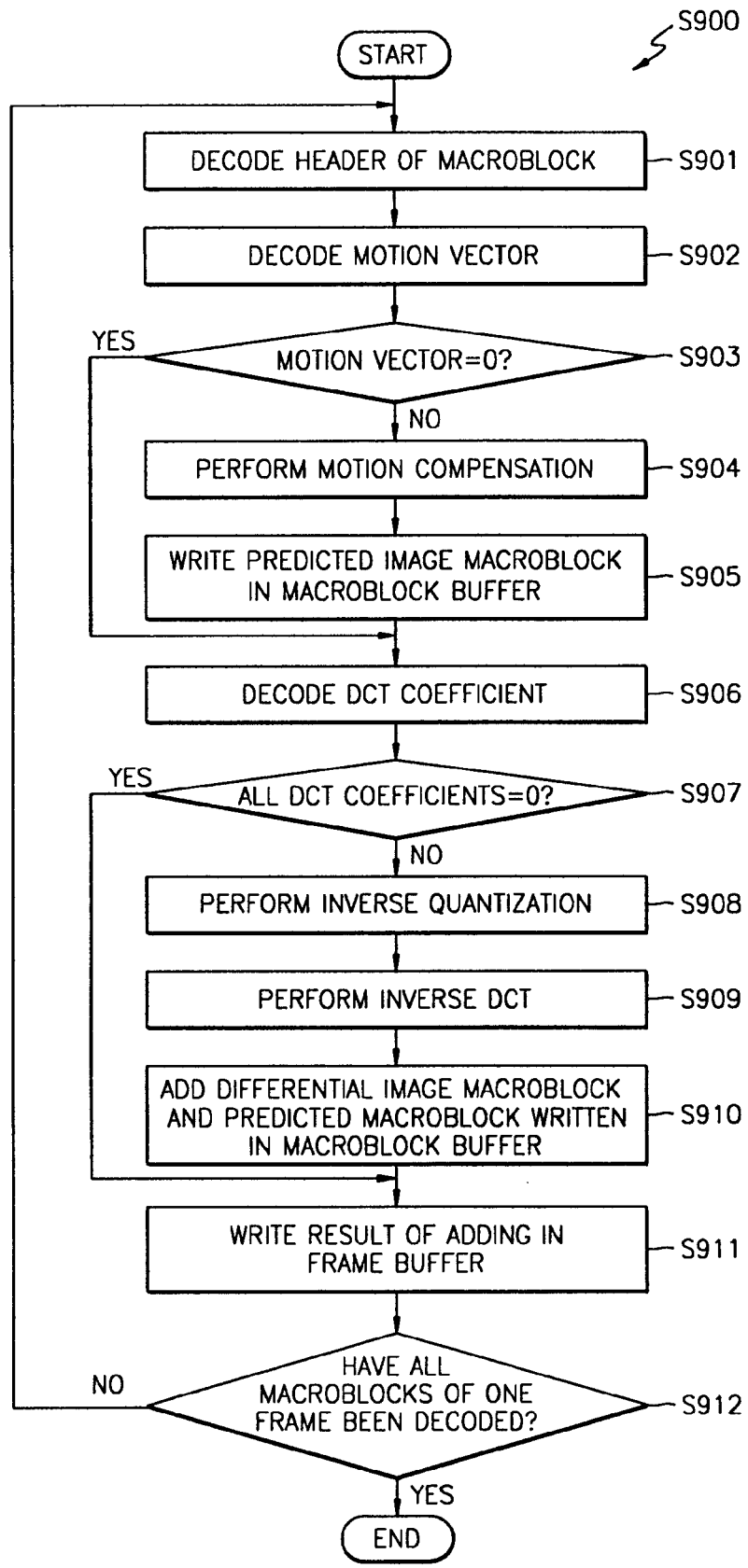
FIG. 9 is a flowchart of a decoding method performed in an MPEG-4 video decoder, according to an exemplary embodiment of the present invention.

FIG. 9 is a flowchart of a decoding method S900 performed in an MPEG-4 video decoder according to an exemplary embodiment of the present invention. Referring to FIG. 9, a header of a macroblock is decoded in step S901.

A motion vector is decoded in step S902 using a variable length decoding method.

It is determined whether or not the decoded motion vector is 0 in step S903.

The method proceeds to step S906 if the decoded motion vector is 0. This transmission indicates that a macroblock of a previous image frame has not had any motion variations, and thus the macroblock of the previous image frame is the same as the macroblock of the current image frame. In this scenario, motion compensation is not performed and the macroblock of the previous image frame is written in the macroblock buffer as the macroblock of the current image frame. Therefore, if the current image is the same as the previous image, the macroblock buffer utilizes previous image information stored in frame memory.

If the motion vector is not 0, motion compensation is performed on the macroblock of the previous image frame in step S904 referring to the decoded motion vector.

The result of the motion compensation is written in the macroblock buffer in step S905.

Thereafter, DCT coefficients are decoded using a variable length decoding method in step S906.

It is determined whether or not each decoded DCT coefficient is 0 in step S907. If each decoded DCT coefficient is 0, which means there is no difference between the current image and the previous image, the method directly proceeds to step S911 without performing texture decoding, i.e., without performing inverse DCT.

However, if a decoded DCT coefficient is not 0, a differential image is generated by performing inverse quantization in step S908 and performing inverse DCT in step S909.

Thereafter, in step S910, the differential image macroblock is added to the predicted image macroblock already written in the macroblock buffer, and the result of the adding is written in a frame buffer in step S911.

Thereafter, in step S912, it is determined whether or not all macroblocks belonging to one frame have been decoded. If all the macroblocks of a single frame have already been decoded, the whole decoding process is complete. But, if there are any remaining macroblocks to be decoded, the method returns to step S901.

Since the present invention allows both motion compensation and texture decoding to be performed immediately on each macroblock, there is no need for motion vector memory to support the number of macroblocks in a VOP.

Hereinafter, with reference to FIGS. 10A through 10C, various performance simulations of an MPEG video decoding method, according to an exemplary embodiment of the present invention, will be described.

In the simulations, shown in FIGS. 10A through 10C, an optimized variation of the Microsoft reference source was used on a Windows 2000-based Intel Pentium III 866 MHz PC platform. In addition, Akiyo (QCIF), Foreman (CIF), and Mobile (CIF) were used as test images. Data was compressed to have an I frame-to-a P frame ratio of 1:30, and bilateral prediction was not performed. Motion compensation has been carried out. An H.263 quantization method was used, and then nine images were obtained by applying different quantization parameters (QP), i.e., 5, 12, and 20 to each of the test images Akiyo, Foreman, and Mobile.

FIG. 10A shows rates of blocks, which have not been subject to texture decoding in each of the test images, and FIG. 10B shows rates of blocks, which have not been subject to motion compensation in each of the test images.

FIG. 10C is a table showing how the nine images were used for comparing the performance of a conventional algorithm with that of an optimized algorithm. FIG. 10C shows that the optimized algorithm, i.e., the decoding method of a preferred embodiment of the present invention, is superior in terms of decoding speed to the conventional algorithm, i.e., the Microsoft reference. In the case of decoding the test images Akiyo and Foreman, the optimized algorithm has decoding speeds at least two times faster than the conventional algorithm irrespective of the quantization parameter (QP).

According to an exemplary embodiment of the present invention, it is possible to conserve memory capacity by generating a decoded image macroblock by macroblock in MPEG video decoding. In addition, in an exemplary embodiment of the present invention, motion compensation is not performed when a motion vector is 0, and inverse DCT is not performed when the value of each DCT coefficient is 0. Thus, the speed of decoding can be considerably increased.

What is claimed is:

1. A video decoding method, comprising:
generating a predicted image macroblock;
checking whether to generate a differential image macroblock;
generating a decoded image macroblock by adding the predicted image macroblock and the differential image macroblock if the differential image macroblock is generated, or by substituting the predicted image macroblock if the differential image macroblock is not generated;
writing the decoded image macroblock in a frame buffer; and
filling the frame buffer with decoded image macroblocks by circularly performing the previous steps.

2. A video decoding method, comprising:
checking whether to generate a predicted image macroblock depending on a value of a decoded motion vector;
writing the predicted image macroblock in a macroblock buffer if the predicted image macroblock is generated;
checking whether to generate a differential image macroblock depending on a plurality of values of decoded transform coefficients;
generating a decoded image macroblock in response to results of the checking whether to generate the predicted image macroblock and the checking whether to generate the differential image macroblock; and
writing the decoded image macroblock in a frame buffer.

3. The video decoding method of claim 2, wherein the checking whether to generate the predicted image macroblock comprises:
determining whether or not the decoded motion vector is 0;
determining a previous image macroblock previously stored in the macroblock buffer as the predicted image macroblock if the decoded motion vector is 0; and
generating the predicted image macroblock by performing motion compensation on the previous image macroblock if the decoded motion vector is not 0.

4. The video decoding method of claim 2, wherein the generating the decoded image macroblock comprises:
if the predicted image macroblock is generated and the differential image macroblock is generated, adding the predicted image macroblock and the differential image macroblock to generate the decoded image macroblock;
if the predicted image macroblock is generated and the differential image macroblock is not generated, determining the predicted image macroblock as the decoded image macroblock;
if the predicted image macroblock is not generated and the differential image macroblock is not generated, determining a previous image macroblock previously stored in the macroblock buffer as the decoded image macroblock; and
if the predicted image macroblock is not generated and the differential image macroblock is generated, adding the previous image macroblock and the differential image macroblock to generate the decoded image macroblock.

5. The video decoding method of claim 2, wherein the checking whether to generate the differential image macroblock comprises;
determining whether or not each of the plurality of values of the decoded transform coefficients is 0;
determining not to generate the differential image macroblock if each of the plurality of values of the decoded transform coefficients is 0; and
generating the differential image macroblock by performing an inverse transform if any of the plurality of values of the decoded transform coefficients is not 0.

6. An MPEG video decoding method, comprising:
generating a predicted image macroblock depending on a value of a decoded motion vector;
writing the predicted image macroblock in a macroblock buffer;
generating a differential image macroblock depending on a plurality of values of decoded DCT coefficients;
generating a decoded image macroblock by adding the differential image macroblock to the predicted image macroblock written in the macroblock buffer; and
writing the decoded image macroblock in a frame buffer,
wherein the generating the differential image macroblock comprises:
determining whether or not the value of each decoded DCT coefficient is 0;

determining not to generate the differential image macroblock if the value of each decoded DCT coefficient is 0; and generating the differential image macroblock by performing inverse DCT if the value of any decoded DCT coefficient is not 0, wherein if the differential image macroblock is not generated, adding the differential image to the predicted image is skipped.

7. A video decoder, comprising:
a predicted image calculation unit generating a predicted image macroblock;
a differential image calculation unit which checks whether to generate a differential image macroblock;
a macroblock buffer where a sum of the predicted image macroblock and the differential image macroblock is stored as a decoded image macroblock if the differential image macroblock is generated, and if the differential image macroblock is not generated, the macroblock buffer stores the predicted image macroblock as the decoded image macroblock; and
a frame buffer where the decoded image macroblock is written, wherein the frame buffer is filled with decoded image macroblocks by circularly generating predicted image macroblocks and differential image macroblocks for a plurality of macroblocks in a frame, adding the respective predicted image macroblocks and the differential image macroblocks for storing in the macroblock buffer as the decoded image macroblocks, and subsequently writing the stored decoded image macroblocks in the frame buffer.

8. A video decoder, comprising:
a predicted image calculation unit which checks whether to generate a predicted image macroblock depending on a value of a decoded motion vector;
a differential image calculation unit which checks whether to generate a differential image macroblock depending on a plurality of values of decoded transform coefficients;
decoded image generator which generates a decoded image macroblock in response to results of the predicted image calculation unit and the differential image calculation unit, and stores the decoded image macroblock in a macroblock buffer; and
a frame buffer where the decoded image macroblock is written.

9. The video decoder of claim 8, wherein the predicted image calculation unit comprises:
a motion vector determiner determining whether or not the decoded motion vector is 0; and
a motion compensator performing motion compensation depending on a result of the determination by the motion vector determiner,
wherein if the decoded motion vector is 0, the motion compensator determines a previous image macroblock previously stored in the macroblock buffer as the predicted image macroblock, and
if the decoded motion vector is not 0, the motion compensator generates the predicted image macroblock by performing motion compensation on the previous image macroblock.

10. The video decoder of claim 8, wherein the differential image calculation unit comprises:
a transform coefficient determiner determining whether or not each of the plurality of values of the decoded transform coefficients is 0; and
an inverse transformer which generates the differential macroblock by performing an inverse transform if any of the plurality of values of the decoded transform coefficients is 0, wherein the inverse transformer does not generate the differential image macroblock if each of the plurality of values of the decoded transform coefficients is 0.

11. The video decoder of claim 8, wherein the decoded image generator adds the predicted image macroblock and the differential image macroblock to generate the decoded image macroblock if the predicted image macroblock is generated and the differential image macroblock is generated, determines the predicted image macroblock as the decoded image macroblock if the predicted image macroblock is generated and the differential image macroblock is not generated, determines a previous image macroblock previously stored in the macroblock buffer as the decoded image macroblock if the predicted image macroblock is not generated and the differential image macroblock is not generated, and adds the previous image macroblock and the differential image macroblock to generate the decoded image macroblock if the predicted image macroblock is not generated and the differential image macroblock is generated.

* * * * *